July 23, 1968  D. E. RAMM  3,394,031
CORE STRUCTURE FOR AN ELECTROLUMINESCENT DEVICE AND
METHOD OF FORMATION THEREOF
Filed May 13, 1964
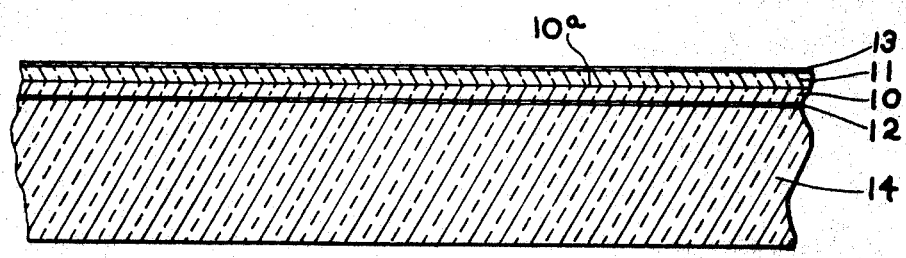
INVENTOR.
DUANE E. RAMM
BY
ATTORNEYS

United States Patent Office 3,394,031
Patented July 23, 1968

3,394,031
CORE STRUCTURE FOR AN ELECTROLUMINESCENT DEVICE AND METHOD OF FORMATION THEREOF
Duane E. Ramm, Marlton, N.J., assignor to Owens-Illinois Glass Company, a corporation of Ohio
Filed May 18, 1964, Ser. No. 367,985
13 Claims. (Cl. 117—215)

ABSTRACT OF THE DISCLOSURE

A phosphor-dielectric core structure and an electroluminescent light-emitting device comprising an electroluminescent light-emissive phosphor material covered and dielectrically insulated by a glass-dielectric material comprised at least in part of a high-lead content dielectric glass, as well as methods of making the same by bonding a finely-divided electroluminescent phosphor with a dielectric glass comprised of a finely-divided high-lead content dielectric glass.

---

The present invention pertains generally to electroluminescent light-emitting devices of the type utilizing a core structure comprised of an electroluminescent phosphor and dielectric material which cooperate in composite relationship when subjected to the influence of a varying electrical field and cause the core structure to emit luminescent light. In a more particular aspect, the more significant and novel concepts of this invention relate to the composition, structure and method of formation of the core structure for an electroluminescent light-emitting device of the foregoing general type.

Among some of the many varied applications in which electroluminescent light-emitting devices are employed are such applications as low-brightness dial lighting, night lights, decorative illumination, and image amplification as well as substitutes for reflective-type illuminating materials. In many of such applications, such electroluminescent light-emitting devices are frequently referred to as electroluminescent panels or cells. So far as is known, however, the present utility of such electroluminescent panels or cells is restricted to applications of the type, such as those just mentioned, in which low-brightness light-output will suffice, although it is recognized that in theory such electroluminescent devices possess the potentiality of producing an economical source of visible light of much greater intensity and in a much more efficient manner.

Among the foremost factors tending to preclude the attainment of greater light-output has been the inability to provide a core structure for an electroluminescent panel or cell which has a sufficiently high dielectric constant and which at the same time is both chemically and physically compatible with the phosphor and other components of the panel. Included in such chemical and physical compatibility requisites are such characteristics as transparency or translucency, durability, moisture impermeability, low softening temperature, and compatible thermal expansion characteristics. Heretofore, in order to take advantage of certain desirable characteristics of the dielectric component of the core structure other desired characteristics of the core structure had to be ignored or at least sacrificed. Moreover, many difficulties have been experienced with core structure dielectric materials of the type heretofore employed. These difficulties are more clearly apparent when the manner of fabrication of these electroluminescent panels or cells and the components thereof are considered, keeping in mind that the conventional manner of preparation of luminescent phosphors for use in devices of the foregoing type, and others, involves an initial preparation of the phosphor, with an activator, as a finely divided powdered or granular material ordinarily having an approximate particle size within the particle size range of about one to ten microns. Also, it is necessary in the fabrication of various luminescent light-emitting devices to anchor the phosphor particles on or within a suitable solid foundation or substrate. In the fabrication of electroluminescent devices, in particular, such anchorage is customarily accomplished by suspending or encasing the phosphor particles, or granules, within a matrix of high dielectric material. When so suspended or encased, the phosphor and matrix of high dielectric material together provide a core structure for an electroluminescent device which functions to emit luminescent light in response to energy excitation produced by subjection of the core structure to a varying electrical field.

So as not to interfere substantially with the transmission of the light emitted from the phosphor, the matrix material preferably should be a transparent, or at least a translucent material. Further, the matrix material must possess a high dielectric constant. Additionally, the matrix material must be capable of being rendered sufficiently flowable to conform to and surround the phosphor particles at temperatures sufficiently low as not to cause significant heat damage or impairment to the light-emitting properties of the phosphor. In this regard, it has been customary to utilize either low melting or low softening-temperature organic thermosetting plastic materials, or fritted ceramic materials. Organic thermosetting plastic materials, however, are somewhat pervious to moisture-vapor penetration which gradually impairs and eventually destroys the light-output capabilities of the phosphor. No less detrimental are the tendencies of such organic thermosetting materials to deteriorate during use, and to frequently permit the occurrence of electrical flash-over between the phosphor particles which are suspended or encased within the organic plastic matrix. These characteristics of organic plastic materials are, of course, injurious and destructive of the light-output capacity, efficiency and expected life of the core structure and, consequently, of the electroluminescent panel or cell itself.

To alleviate many of the detrimental effects of organic plastic dielectric materials certain fritted ceramic materials have been employed, but, so far as is known, only with a limited degree of success. The use of fritted ceramic materials ordinarily requires exposure of the phosphor to injurious high temperatures during the course of formation of the phosphor-dielectric core structure. Exposure to such high temperatures tends to produce thermal degradation of the phosphor particles and impairs or destroys the light-output capacity thereof. A further problem is that the thermal expansion coefficients of most ceramic dielectric materials are not well-suited for good fusion to the other components of most types of electroluminescent panels or cells. In this regard, it is quite common to bond the phosphor-dielectric core structure to a transparent glass substrate having a coefficient of thermal expansion extremely different from that of the ceramic component of the core structure. Consequently, the bond between the core structure and the glass substrate is relatively unstable, particularly where the panel or cell may encounter temperature variations. Far from the least significant, however, is the undesirable tendency of most of the ceramic materials to possess an unsuitably low dielectric constant.

As a consequence of the problems encountered in seeking to improve the performance capabilities and characteristics of electroluminescent lighting devices, a substantial amount of endeavor has been directed towards achieving a phosphor-dielectric core structure which is capable of imparting improved performance characteristics to an electroluminescent device such as an electroluminescent panel or cell of the types described. To that end, it has been found that such improved characteristics are obtainable in accordance with the practice of the present invention.

In contrast with the methods and materials heretofore employed, the present invention provides a transparent or translucent phosphor-dielectric core structure utilizing a combination phosphor-glass dielectric medium which exhibits highly enhanced dielectric properties as well as exceptional moisture impermeability, increased light-output efficiency, durability and useful life. Furthermore, the utilization of the combination phosphor-glass dielectric core structure of the present invention, in conjunction with an electroluminescent panel or cell, permits the core structure to be selected to closely match the thermal expansion coefficients of the other panel components, as well as to be heat-shaped and formed into the requisite thermally bonded core structure without causing appreciable heat-damage to the phosphor or other panel components. These and other advantages of the present invention are more particularly alluded to, in part, in the ensuing disclosure and objectives pertaining to the present invention.

One principal objective of the present invention is the provision of a combination phosphor and glass dielectric media for use as a core structure in luminescent light-emitting devices.

Another important objective of the present invention is to provide means for improving the light intensity and efficiency of electroluminescent devices such as electroluminescent panels or cells.

Another objective of the present invention is the provision of a phosphor-dielectric core structure for an electroluminescent device wherein the core structure is comprised of electroluminescent phosphor particles having a protective dielectric coating of low-softening temperature glass covering said phosphor particles.

Another objective of the present invention is the provision of a phosphor-dielectric core structure having the characteristics of the last-mentioned objective, and wherein the core-structure dielectric material is comprised of a low-softening temperature high lead content glass.

Another objective of the present invention is the provision of a transparent, or translucent, dielectric material which is adaptable to use in the formation of a dielectric core structure for an electroluminescent light-emitting device and which, at the same time, will render the core structure more durable and more impervious to moisture penetration than conventional dielectric materials heretofore employed.

Another objective of the present invention is to provide a phosphor-dielectric core structure having a coefficient of thermal expansion closely compatible with the glass components commonly making up a part of conventional electroluminescent panel structures.

Another specific objective of the present invention is the provision of a glass dielectric media possessing a high dielectric constant and which may be formed into thin layers or films suitable for use in the formation of a thin phosphor-dielectric core structure.

An additional objective of the present invention is the provision of methods and materials suitable for effecting each of the foregoing objectives.

In the preparation of a phosphor-glass dielectric core structure in accordance with the present invention, it has been ascertained that the use of a low-softening temperature, high-lead content glass as a component part of the core structure imparts highly desirable and substantially improved characteristics to the core structure and the overall properties of the electroluminescent panel or cell. As used herein, the term "high-lead content glass" means a glass having a theoretical lead oxide content which constitutes not less than twenty percent by weight of the total theoretical oxide content of the glass, but which is preferably at least fifty percent by weight thereof. As further used herein, a low softening temperature glass means a glass which at a temperature of 600° C. exhibits a viscosity not greater than $10^{7.6}$ poises. Further, in accordance with the present invention, it has been determined that the above-mentioned improved characteristics and properties are obtainable irrespective of whether the low-softening temperature, high-lead content glass component is utilized in the core structure in direct contact with the granular or particulate phosphor, or whether it is employed as a dielectric overlayer which is substantially free of direct interfacial contact with the phosphor particles. In the latter regard, utilization of a lead-free glass appears to be preferable in some instances where the particular electroluminescent phosphor, which is to be employed, is somewhat susceptible to impairment or "poisoning" when exposed to the presence of lead or lead oxide. In the latter event, it has been found to be preferable to utilize a lead-free, low-softening temperature glass in direct contact with the particulate or granular phosphor, and then to provide the composite lead-free glass and phosphor with an overlayer composed of a low-softening temperature, high-lead content glass. In such instances, the employment of a low-softening temperature, lead-free glass will afford protection to the phosphor to preclude any substantial impairment or "poisoning." In this latter respect, however, it is particularly noteworthy that the employment of high-lead content glasses having the characteristics of those which will be subsequently described are, contrary to common belief in the art, suitable for use in direct contact with most phosphors heretofore believed not to be capable of employment in contact with a lead-bearing substance. The exact reason for the success achieved by the present invention in utilizing high-lead content glasses in direct contact with such phosphors is not subject to complete explanation. However, it is believed that the low-softening temperature characteristics of these high-lead content glasses either permits their use at temperatures sufficiently low that lead-impairment or poisoning does not occur, or that the amount of lead-impairment, or lead-poisoning, which does occur is more than compensated for by the elimination of the adverse effects attending the use of conventional dielectric materials, such as ceramic materials, which require exposure of the phosphor to much higher temperatures during fabrication of the core structure, or such as organic thermosetting plastic materials, which frequently permit moisture penetration and localized electrical arcing.

In the illustrated embodiment of the invention, there is generally depicted a sectional view of a thin electroluminescent panel assembly which, although ordinarily planar in design, may be shaped to conform to various desired configurations. Forming a medial part of the panel assembly there is a phosphor-dielectric layer 10 which is composed of finely powdered or granular electroluminescent phosphor material dispersed in dielectric glass. Superimposed over one face-surface of the phosphor-dielectric layer, as at 10a, there is a layer of high-lead content glass 11 which possesses enhanced dielectric properties and which, in cooperative association with the phosphor-dielectric layer 10, substantially increases and promotes the light-output characteristics and efficiency of the phosphor-dielectric layer. At their interface, at 10a, the phosphor-dielectric layer 10 and the high-lead content glass layer 11 are thermally fused together to form a durable, moisture and air impervious interfacially sealed juncture. Together, the phosphor-dielectric layer 10 and the layer of high-lead content glass 11 form the core structure of the electroluminescent panel assembly. On the oppositely disposed or non-contacting face-surfaces of the core structure, as at 12 and 13, there is an electrically conductive film or coating, and each such coating or film functions as an electrode. Each of the electrodes are capable of being energized by a suitable variable electrical energy source, not illustrated, such as, for example, a conventional household source of 110 volt alternating electric current. For protective purposes, the panel may be covered by a transparent substrate, such as a transparent glass plate 14, which isolates and prevents exposure or damage of the core structure or other interior panel components. In this respect, both exposed face surfaces of the core structure may be protectively covered. However, only one of the panel coverings and conductive coatings ordinarily needs to be transparent since such panels are usually only viewed or are intended to emit light from one of such face surfaces.

One preferred procedure which may be satisfactorily followed in the fabrication of an electroluminescent panel assembly of the foregoing-type involves direct application of the phosphor-dielectric layer 10 onto the conductively-coated surface of a commercially prefabricated sheet of transparent, electrically conductive glass. By utilizing a conductively coated glass, the glass functions to provide both the transparent substrate 14 and the transparent electrode 12. Such conductively-coated glass is well-known and may be obtained from commercial sources. One source, among others, of commercially prepared electrically conductive glass is Libbey-Owens-Ford Glass Company of Toledo, Ohio, which manufactures and sells such glass under the trademark "Electrapane." Such glass is ordinarily readily obtainable with a conductive coating of about 120 ohms resistance and an overall coefficient of thermal expansion for the glass of about $81 \times 10^{-7}$ per degree C. Alternatively, a sheet of transparent, electrically-conductive glass may be prepared in a conventional manner by subjecting one face surface of ordinary soft, transparent window-glass, to the influence of vapors of stannic tetrachloride, or to a spray of an alcohol solution of stannic tetrachloride. Transparent, electrically-conductive coatings, or films, of silicic or titanic oxide may be similarly applied to the transparent glass in accordance with well-known, prior-art methods and procedures.

The phosphor-dielectric layer 10 is first prepared as a uniformly dispersed admixture comprised of a powdered, or finely granulated, electroluminescent phosphor and finely-divided, solid particles of a low-softening temperature, dielectric glass. The phosphor, generally, may be most any finely-divided phosphor material which is capable of undergoing excitation and emitting appreciable luminescent light when exposed in a dielectric medium to the influence of a variable electrical field. For most general uses, however, the phosphor should be highly luminescent within the visible range of the spectrum. One conventional electroluminescent phosphor representative of such characteristics is a zinc sulfoselenide phosphor. Other suitable and well-known electroluminescent phosphors of this type are phosphors of zinc selenide or zinc sulfide.

The finely powdered, or fritted, glass utilized in conjunction with the phosphor for the preparation of the phosphor-dielectric admixture is a low-softening temperature glass, as previously defined, and is selected to provide a high degree of transparency or translucency and to have a coefficient of thermal expansion compatible with the conductively coated substrate, such as the glass plate 14, at the temperatures which will be encountered during fabrication and use of the panel assembly.

Although other specialized lead-free glass compositions having the above-mentioned physical properties may be employed with varying degrees of success, a preferably lead-free soft glass composition found to be particularly suitable for use in the fabrication of the phosphor-dielectric layer 10 is represented in Table I, below.

TABLE I

| Ingredients: | Composition percent (by weight) |
| --- | --- |
| $K_2O$ | 3.8 |
| $Al_2O_3$ | 5.7 |
| $SiO_2$ | 13.3 |
| $Na_2O$ | 5.7 |
| ZnO | 9.5 |
| BaO | 4.8 |
| $Li_2O$ | 2.9 |
| CaO | 4.8 |
| $B_2O_3$ | 49.5 |
| Total | 100.0 |

The soft glass composition represented in Table I, above, possesses a viscosity of $10^{7.6}$ poises at a temperature of approximately 580° C. and a coefficient of thermal expansion of about $73 \times 10^{-7}$ per degree C. These low-softening temperature and thermal expansion properties render the glass composition of Table I particularly suitable for use both with the common types of electroluminescent phosphors and with transparent conductively coated glass substrates such as "Electrapane."

In preparing the phosphor-dielectric layer 10, the glass is ground to a particle size on the order of three microns and then mixed and blended together with a finely powdered or ground measure of phosphor in dry form, on a dry glass to phosphor weight ratio, of about 1:1. To the powdered glass-phosphor admixture may be added a vehicle or carrier suitable for initially adhering or cementing a very thin layer of the admixture onto the conductively coated surface of the glass plate 14. One type of vehicle or carrier which is particularly satisfactory for such purposes is a mixture of 1½% nitrocellulose in amyl acetate. Depending upon the desired viscosity, of course, varying quantities of the vehicle or carrier can be added. By the use of such a vehicle or carrier the admixture may be applied to the conductively coated glass plate 14 in accordance with various well-known methods of application. For example, it may be carried out by such methods as spraying, or by spatula, brush, or doctor blade application, as well as by wet dipping or dry powder dipping techniques, or by roller coating procedures. However, the preference herein is to apply the admixture by a spray application. For application by the process of spraying, the addition of approximately 50% by weight of the nitrocellulose-amyl acetate vehicle to the powdered phosphor-glass admixture is preferable in order to permit the admixture to be readily emitted and applied as a thin film from a conventional spray-type applicating gun. Ordinarily, improved phosphor coverage and film continuity will be achieved by applying successive thin films. In this regard, it is preferred that the spray application be carried out in such manner that the ultimate film thickness, whether applied as one or a succession of superimposed films, be between approximately 0.001 and 0.003 inch. Both before and during the spraying application continuous agitation of the nitrocellulose-amyl acetate vehicle and admixture is recommended to insure against undesirable separation of the admixture from the vehicle. After the spray application the film is permitted to dry. Due to the highly volatile nature of the nitrocellulose-amyl acetate vehicle such drying may be occasioned very rapidly leaving the admixture bonded to the glass plate 14 with a relatively high degree of green strength. Thereafter, the adhered phosphor-glass admixture is heated and fused to the surface of the conductively coated glass plate 14 at temperatures in the range of 600° C. to 750° C. for a time interval ranging between approximately 5 and 30 minutes, depending upon the thickness of the layer applied and the particular time-temperature relationship employed. As an incident of the fusion step, the nitrocellulose-amyl acetate vehicle is caused to volatilize and burn out without leaving deleterious residue remaining in the resultant, fused phosphor-glass dielectric layer.

According to this aspect of the invention, the layer of high-lead content glass 11 is superimposed over the phosphor-dielectric layer 10 so that only limited contact is obtained between the high-lead content glass and the actual phosphor particles in the phosphor-dielectric layer 10. The high-lead content glass imparts to the core structure and phosphor dielectric-layer 10 such desirable properties, among others, as a high-dielectric constant, moisture impermeability, and low-temperature softening and forming characteristics, as well as excellent sealing properties with respect to the other associated components of the core structure and panel assembly. In this regard, the low-temperature softening and forming characteristics are particularly significant in that the high-lead content of the glass in the layer 11 permits it to be heat-softened at temperatures which will not appreciably affect the phosphor or the other components of the panel assembly. Additionally, the use of a high-lead content glass has been found to provide exceptionally high-dielectric strength to the core structure of the panel assembly which in turn enhances the light-output capacity of the phosphor. Furthermore, as will appear from the following Tables II and III, high-lead content glasses of both the vitreous and devitrifying types have been found to be highly advantageous in this respect and either type may be employed according to individual preference.

A preferred example of a composition range for vitreous-type, high-lead content glass compositions especially suitable for the formation of the high-dielectric glass layer 11 is exemplified in Table II, below, whereas an especially suitable composition range for a devitrifying-type, high-lead content glass is set forth in Table III, thereafter.

TABLE II

| Constituent: | Percent (by weight) |
| --- | --- |
| $SiO_2$ | 2.0–3.0 |
| $B_2O_3$ | 15.4–16.3 |
| ZnO | 8.8–9.0 |
| CuO | 2.1–3.0 |
| BaO | 0.0–3.0 |
| $Al_2O_3$ | 0.0–3.0 |
| PbO | Balance |
| Total | 100.0 |

TABLE III

| Constituent: | Percent (by weight) |
| --- | --- |
| $SiO_2$ | 1.0–3.0 |
| $B_2O_3$ | 6.5–10.0 |
| ZnO | 10.0–15.0 |
| CuO | 0.0–5.0 |
| $Al_2O_3$ | 1.0–3.5 |
| PbO | Balance |
| Total | 100.0 |

The high-lead content glass composition ranges depicted in Tables II and III have an overall range of coefficients of thermal expansion ranging between about 80 to $120 \times 10^{-7}$ per degree C. As a consequence, the compositions of both Table II and Table III are readily capable of forming strong seals with the lead-free glass composition depicted in Table I. Furthermore, very low sealing temperature ranges on the order of 420° to 500° C. may be utilized and, depending upon the exact sealing temperature or temperatures employed, extremely strong and durable seals may be effected at such temperatures in a matter of from about 10 to 30 minutes.

The high-lead content glass layer 11 is susceptible of many preferred methods of application. Preferably, however, in similar manner as the phosphor-dielectric layer 10, the high content lead glass is ground or crushed to a particle size on the order of microns and thereafter applied over the face surface of the phosphor-dielectric layer 10 by spraying procedures of the same nature as those previously described with respect to the application of the phosphor-dielectric layer 10. In utilizing a spray-type of application, a thin continuous film of powdered lead solder glass is applied in superimposed relationship over the previously applied and thermally fused phosphor-dielectric layer 10. For ordinary usage, a superimposed layer of lead solder glass ranging from 0.001 to 0.003 inch in thickness is ordinarily preferable and such thickness may be the resultant product of one or more thin coatings or films of the high-lead content glass. Thereafter, the superimposed lead glass layer is thermally fused and bonded to the phosphor-dielectric layer 10 to produce a rigid and durable core structure having the desired characteristics of high-dielectric constant and moisture impermeability. The fusion is accomplished by subjecting the superimposed layer of lead glass to temperatures preferably between about 420° C. to 500° C. for a time interval of approximately 10 to 30 minutes duration; the time interval, of course, being related to and dependent in large measure upon the particular temperature or temperatures employed. With certain of the types of high-lead content glass compositions represented in Tables II and III, much lower fusion temperatures on the order of 375° C. applied for a period of time, as short as approximately 10 minutes, have given highly satisfactory results. In any event, however, fusion temperatures of even the higher order of 500° C. produce extremely good results because, even at temperatures of this order, appreciable heat damage to the phosphor is obviated.

The conductive coating 13 which is superimposed over the layer of high-lead content glass 11 may be a transparent conductive coating of the same composition as the conductive coating 12, whereby the conductive coating 13 can be applied, as illustrated, directly to a high-dielectric glass 11 in the same well-known manner of application previously described with respect to the application of the conductive coating 12. Alternatively, where transparency or translucency is of no significant import, the conductive coating 13 may be composed of most any conventional electrically conductive material susceptible of being adhered as a thin film or layer on the exposed face surface of the layer of high-lead content glass. For example, the conductive coating may be a film or thin coating of evaporated aluminum or metallic paint, or may be a thin conductive sheet of metal or metal foil, or other suitable electrically conductive material conventionally utilized for the formation of surface electrodes in electroluminescent cells.

In accordance with the other, no less important, aspect of this invention, it has been found that the glass dielectric component of the core structure can be prepared entirely from a high-lead content glass and that such a core structure is particularly well-suited for use in conjunction with most conventional electroluminescent phosphors. Following the same manner of preparation and application as that previously described with respect to the preparation and application of the powdered or granular phosphor and lead-free glass admixture, a high-lead content glass is admixed with the phosphor. Preferably, the high-lead content glass is selected to have a composition within the composition ranges established in Table II or III and, due to the low-softening temperatures of the glass compositions of Tables II and III, the admixture may be fused to the glass plate 14 by subjecting the admixture to the much lower time-temperature conditions discussed above with respect to the formation of the layer of high-lead content glass 11. Thereafter, to prevent direct electrical contact or arcing between the phosphor-dielectric layer 10 and the conductive coating 13, the phosphor-dielectric layer is covered with a layer or layers of high-lead content glass 11, as before, and surfaced with a conductive coating 13.

In the foregoing description, the most preferable high-lead content glass compositions were set forth in Tables II and III and covered a lead content range between about 62.8 to 80% lead based upon the theoretical lead oxide content of the glass compositions. However, it is not intended that, by reference to high-lead content glass compositions, such glass compositions be limited to the ranges specified in Tables II and III. In this regard, it has been found that improved results can be obtained with glass compositions in which the lead content may range as low as 20% lead oxide. However, glasses on the order of 20% lead oxide ordinarily tend to have much lower coefficients of thermal expansion which, depending somewhat upon the other various constituents in the glass are on the order of 50 to $55 \times 10^{-7}$ per degree C. Keeping in mind that the substrate such as the transparent glass plate 14 is usually a soft glass composition, such as orginary window-type glass, having a much higher coefficient of thermal expansion, a powdered glass having a lead oxide content of the order of 20% is not most ideally suited for fusion thereto. Nonetheless, fusion and a bond of adequate strength can be obtained between ordinary soft glasses and a 20% lead oxide glass which is capable of use in applications where extreme temperature variations are not encountered. However, to avoid any substantial degree of disparity between the coefficients of thermal expansion, it is preferred to utilize a lead glass composition in which the lead content is at least 50% by weight of the theoretical oxide content of the glass composition. Further in this regard, numerous high-lead content sealing glasses and solder glasses are well-known in the art and it is not intended that the present invention be considered as directed to the disclosure of new or novel high-lead content glasses in and of themselves. The high-lead content glasses hereinbefore set forth are merely representative of specific examples of certain glass compositions suitable for the practice of this invention. Further in this regard, it will, of course, be understood that various details pertaining to the features of construction and the methods disclosed may be modified throughout a wide range without departing from the principles of this invention, and it is, therefore, not the purpose to limit the patent granted hereon otherwise than as may be necessitated by the scope of the appended claims.

I claim:

1. In an electroluminescent light-emitting device having a pair of electrically conductive surfaces disposed in spaced parallel array and being cooperatively responsive to energization by a source of alternating electrical voltage to produce a variable electrical field in the medial space between said conductive surfaces, a phosphor-glass dielectric core structure sandwiched between said conductive surfaces and occupying said medial space, said core structure comprising an electroluminescent phosphor and an adherent coating of high-lead content glass overlying said electroluminescent phosphor, said adherent coating of high-lead content glass consisting essentially of 1.0 to 3.0 weight percent $SiO_2$, 6.5 to 16.3 weight percent $B_2O_3$, 8.8 to 15 weight percent ZnO, 0.0 to 5.0 weight percent CuO, 0.0 to 3.0 weight percent BaO, 0.0 to 3.5 weight percent $Al_2O_3$, and PbO as the balance thereof.

2. In an electroluminescent device according to claim 1 wherein said high-lead content glass possesses a coefficient of thermal expansion ranging between about 80 to $120 \times 10^{-7}$ per degree C.

3. In an electroluminescent light-emitting device according to claim 1, including an adherent coating of lead-free dielectric glass surrounding said electroluminescent phosphor and adhered to and between the latter and said adherent coating of high-lead content glass.

4. In an electroluminescent light-emitting device according to claim 3, wherein said lead-free dielectric glass possesses a softening temperature of less than 600° C.

5. In an electroluminescent light-emitting device according to claim 3, wherein said lead-free dielectric glass consists essentially of 3.8 weight percent $K_2O$, 5.7 weight percent $Al_2O_3$, 13.3 weight percent $SiO_2$, 5.7 weight percent NaO, 9.5 weight percent ZnO, 4.8 weight percent BaO, 2.9 weight percent $Li_2O$, 4.8 weight percent CaO, and 49.5 weight percent $B_2O_3$.

6. In an electroluminescent light-emitting device having a pair of electrically conductive surfaces disposed in spaced parallel array and being cooperatively responsive to energization by a source of alternating electrical voltage to produce a variable electrical field in the medial space between said conductive surfaces, a phosphor-glass dielectric core structure sandwiched between said conductive surfaces and occupying said medial space, said core structure comprising an electroluminescent phosphor and a thin adherent coating of lead-free dielectric glass surrounding said electroluminescent phosphor, said lead-free glass consisting essentially of 3.8 weight percent $K_2O$, 5.7 weight percent $Al_2O_3$, 13.3 weight percent $SiO_2$, 5.7 weight percent NaO, 9.5 weight percent ZnO, 4.8 weight percent BaO, 2.9 weight percent $Li_2O$, 4.8 weight percent CaO, and 49.5 weight percent $B_2O_3$, and a thin adherent coating of high-lead content glass overlying said lead-free glass and fused thereto, said high-lead content glass consisting essentially of 1.0 to 3.0 weight percent $SiO_2$, 6.5 to 16.3 weight percent $B_2O_3$, 8.8 to 15 weight percent ZnO, 0.0 to 5.0 weight percent CuO, 0.0 to 3.0 weight percent BaO, 0.0 to 3.5 weight percent $Al_2O_3$, and PbO as the balance thereof.

7. In an electroluminescent light-emitting device according to claim 6, wherein said lead-free dielectric glass possesses a softening temperature of less than 600° C.

8. The method of making a dielectric core structure for an electroluminescent device of the type having a dielectric core structure disposed in sandwiched relationship between a pair of electrically conductive surfaces disposed in spaced parallel relationship which comprises the steps of providing a thin admixed adherent coating of finely divided electroluminescent phosphor material and dielectric glass having a phosphor to glass weight ratio of about 1:1 upon one of the electrically conductive surfaces, providing a thin adherent coating of high-lead content glass over the first-mentioned adherent coating consisting essentially of 1.0 to 3.0 weight percent $SiO_2$, 6.5 to 16.3 weight percent $B_2O_3$, 8.8 to 15 weight percent ZnO, 0.0 to 5.0 weight percent CuO, 0.0 to 3.0 weight percent BaO, 0.0 to 3.5 weight percent $Al_2O_3$, and PbO as the balance thereof, and thermally bonding said first-mentioned adherent coating together with both said last-mentioned electrically conductive surface and said thin adherent coating of high-lead content glass.

9. The method according to claim 8, wherein said dielectric glass constitutes a lead-free glass.

10. The method according to claim 9, wherein said lead-free glass possesses a softening temperature of less than 600° C.

11. The method according to claim 8, wherein said dielectric glass is a lead-free glass consisting essentially of 3.8 weight percent $K_2O$, 5.7 weight percent $Al_2O_3$, 13.3 weight percent $SiO_2$, 5.7 weight percent NaO, 9.5 weight percent ZnO, 4.8 weight percent BaO, 2.9 weight percent $Li_2O$, 4.8 weight percent CaO, and 49.5 weight percent $B_2O_3$.

12. The method according to claim 8, wherein said dielectric glass is a lead-free glass consisting essentially of 3.8 weight percent $K_2O$, 5.7 weight percent $Al_2O_3$, 13.3 weight percent $SiO_2$, 5.7 weight percent NaO, 9.5 weight percent ZnO, 4.8 weight percent BaO, 2.9 weight percent $Li_2O$, 4.8 weight percent CaO, and 49.5 weight percent $B_2O_3$, and a thin layer of high-lead content glass overlying said layer of lead-free glass and fused thereto, said layer of high-lead content glass consisting essentially of 1.0 to 3.0 weight percent $SiO_2$, 6.5 to 16.3 weight percent $B_2O_3$, 8.8 to 15 weight percent ZnO, 0.0 to 5.0 weight percent CuO, 0.0 to 3.5 weight percent $Al_2O_3$, and PbO as the balance thereof, and wherein said high-lead content glass consists essentially of 1.0 to 3.0 weight percent $SiO_2$, 6.5 to 16.3 weight percent $B_2O_3$, 8.8 to 15 weight percent ZnO, 0.0 to 5.0 weight percent CuO, 0.0 to 3.5 weight percent $Al_2O_3$, and PbO as the balance thereof.

13. The method according to claim 8, wherein said dielectric glass and said high-lead content glass both consist essentially of 1.0 to 3.0 weight percent $SiO_2$, 6.5 to 16.3 weight percent $B_2O_3$, 8.8 to 15 weight percent ZnO, 0.0 to 5.0 weight percent CuO, 0.0 to 3.0 weight percent BaO, 0.0 to 3.5 weight percent $Al_2O_3$, and PbO as the balance thereof.

References Cited
UNITED STATES PATENTS

| | | | |
|---|---|---|---|
| 2,887,402 | 5/1959 | Ballard | 313—108 X |
| 3,046,433 | 7/1962 | Browne | 313—108 |
| 3,127,534 | 3/1964 | Diemer | 313—108 |

WILLIAM L. JARVIS, *Primary Examiner.*